United States Patent
Okanda et al.

(10) Patent No.: US 6,888,089 B2
(45) Date of Patent: May 3, 2005

(54) METHOD OF AND DEVICE FOR SETTING REFERENCE POSITION FOR SERVO SPOT WELDING GUN

(75) Inventors: Koichi Okanda, Yamanashi (JP); Takeaki Aramaki, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 220 days.

(21) Appl. No.: 10/105,185

(22) Filed: Mar. 26, 2002

(65) Prior Publication Data

US 2002/0134762 A1 Sep. 26, 2002

(30) Foreign Application Priority Data

Mar. 26, 2001 (JP) .......................................... 2001/87353

(51) Int. Cl.[7] .............................................. B23K 11/25
(52) U.S. Cl. .................................. 219/86.41; 219/91.1
(58) Field of Search ............................. 219/86.41, 109, 219/110, 86.51, 91.1

(56) References Cited

U.S. PATENT DOCUMENTS

| | | | | |
|---|---|---|---|---|
| 4,841,113 A | * | 6/1989 | Hamada et al. | 219/86.41 |
| 4,912,294 A | * | 3/1990 | Tsujii | 219/86.24 |
| 5,883,355 A | | 3/1999 | Kaneshima | |
| 5,898,285 A | | 4/1999 | Nagasawa et al. | |
| 6,201,206 B1 | * | 3/2001 | Kitamura | 219/109 |
| 6,274,840 B1 | * | 8/2001 | Kanjo | 219/86.41 |

FOREIGN PATENT DOCUMENTS

| | | |
|---|---|---|
| EP | 0 818 268 A2 | 6/1997 |
| EP | 1 005 943 A2 | 11/1999 |
| JP | 11-285849 | 10/1999 |

* cited by examiner

Primary Examiner—Clifford C. Shaw
(74) Attorney, Agent, or Firm—Staas & Halsey LLP

(57) ABSTRACT

A method of and device for automatically setting and updating a reference position of a welding tip of a servo spot welding gun to automatically compensate displacement of a distal end of a welding tip by abrasion thereof. A movable welding tip is moved towards a stationary welding tip to press the stationary welding tip until an estimated disturbance load reaches a fist threshold, and then moved in reverse direction away from the stationary welding tip until the disturbance load is reduced to a second threshold. The position of the movable welding tip when the disturbance load is reduced to the second threshold is set and updated as the reference position of an axis of the movable welding tip. The first threshold is set to be greater than a frictional force exerted on the axis of the movable welding tip in the motion towards the stationary welding tip, and the second threshold is set to be equivalent to the frictional force. The above setting and updating of the reference position is performed in cycles of spot welding operations to compensate the abrading of the welding tip. Since the reference position is automatically set and updated to compensate the abraded amount of the welding tip, the distal end of the movable welding tip is constantly positioned to a predetermined position for applying a predetermined pressure to the workpiece.

7 Claims, 7 Drawing Sheets

METHOD OF AND DEVICE FOR SETTING REFERENCE POSITION FOR SERVO SPOT WELDING GUN

BACKGROUND OF THE INVENTION

1. Field of the Invention

The present invention relates to a servo welding gun for a spot welding operation in which a welding tip (electrode) is driven by a servomotor to control a position of a distal end of the welding tip, and in particular to a method of and a device for setting a reference position of the movable welding lip of the servo welding gun which is attached to an industrial robot.

2. Description of the Related Art

In performing a spot welding operation by a servo welding gun attached to a robot, it is a common practice to control a position of a movable welding tip of the servo welding gun for applying a predetermined pressure to a workpiece as an object of welding between the movable welding tip and a stationary welding tip. For controlling the position of the movable welding tip in the spot welding, the movable welding tip is brought into contact with the stationary welding tip and a position of the movable welding tip in contact with the station welding tip is set and registered as a reference position (zero position) of an axis of the movable welding tip, before performing a teaching operation to the robot. The operation of setting the reference position has been performed manually by an operator for moving the movable welding tip to make contact with the stationary welding tip and setting the contact position as the reference position. The position of the movable welding tip is controlled on the basis of the set reference position in performing the spot welding operation. Specifically, after the welding gun is positioned with the distal end of the stationary welding tip in contact with one side of a workpiece, the movable tip is moved towards the stationary welding tip so that the distal end of the movable welding tip is positioned at a pressing position where a predetermined pressure is applied to the workpiece between the movable and stationary welding tips and an electric current is supplied therebetween.

The distal end of the welding tip is abraded to shorten the welding tip with a long time use, so that the predetermined pressure is not applied to a workpiece when the movable welding tip is moved to the pressing position to fail in performing an appropriate spot welding. Conventionally, the pressing position of the movable welding tip is compensated by an amount of abrasion of the welding tip. In order to determine the abrasion amount, an original position of the welding tip before the teaching operation (before abrasion of the welding tip) is stored in advance and the abrasion amount is determined as a difference between positions of the welding tip before and after abrasion of the welding tip.

FIGS. 7a–7e show conventional operations for determining the reference position (zero position) of the axis of the movable welding tip and the original position of the movable welding tip before a teaching operation (when the welding tip is not abraded), and an spot welding operation with compensation of the abrasion amount.

As shown in FIG. 7a, a movable welding tip 21 is moved so that a distal end of the movable welding tip 21 is brought into contact with a distal end of a stationary welding tip 22 through manual operation by an operator visually confirming the position of the distal end of the movable welding tip 21, and a position of the axis of the movable welding tip 21 deemed to be in contact with the stationary welding tip 22 is registered as a reference position (zero position). Further, in order to obtain a correction amount for compensating the abrasion of the movable welding tip 21, the servo gun 20 is moved to take predetermined position and posture where the movable welding tip 21 and the stationary welding tip 22 are positioned with a jig 30 fixed at a predetermined position therebetween, as shown in FIG. 7b, then the movable welding tip 22 is brought into contact with the jig 30 and the position of the movable welding tip 21 deemed to be in contact with the stationary welding tip 22 is registered as an original position of the movable welding tip 21 before abrasion. In the similar manner or other known method, an original position of the distal end of the stationary welding tip 22 before abrasion is stored.

As shown in FIG. 7c, in performing welding operations, the servo gun 20 is moved to a position where the distal end of the stationary welding tip 22 is brought into contact with one side of a workpiece 40 and then the movable. welding tip 21 is driven towards the stationary welding tip 22 to the pressing position where the predetermined pressure is applied to the workpiece 40 between the movable and stationary welding tips 21 and 22, and an electric current is supplied therebetween for spot welding the workpiece 40.

After a long time use, the welding tips 21 and 22 are abraded to fail in applying the predetermined pressure to the workpiece 40 therebetween, as schematically shown in FIG. 7d. In FIG. 7d, it should be noted that an abrasion amount of the stationary welding tip 22 is compensated and the servo gun 20 is positioned so that the stationary welding tip 22 is brought into contact with a lower surface of the workpiece 40. Thus, a distance "d" between the distal end of the movable welding tip 21 and the pressing position, which is depicted exaggerated, represents a sum of abraded amounts of the movable welding tip 21 and the stationary welding tip 22.

In this state, an appropriate welding is not performed. Before coming into such state, the servo welding gun 20 is moved to the predetermined position again and the movable welding tip 21 is brought into contact with the jig 30 and the position of the movable welding tip 21 in contact with the jig 30 is determined and a difference between the obtained position and the stored original position is determined as an amount of abrasion of the movable welding tip 21. The motion amount of the movable welding tip 21 is corrected based on the correction amount d which is a sum of the abrasion amount of the movable welding tip 21 and the stationary welding tip 22, so that the distal end of the movable welding tip 21 is moved to the pressing position. With this correction, the predetermined pressure is applied to the workpiece 40 by the movable and stationary welding tips 21 and 22, as shown in FIG. 7e.

In the above described conventional method, a predetermined pressing position is corrected by abrasion amounts of the welding tips. In the practical use, a predetermined spot welding operation may be performed without correction of the pressing position in view of welding efficiency with being aware of deterioration of welding quality.

With the above conventional method, since the operation of obtaining the reference position of the welding tip of the servo welding gun 20 has to be carried out manually depending on an operator's visual confirmation, dispersion of precision of the reference position, the distal end of the movable welding tip does not reach the predetermined pressing position to fail in applying the predetermined pressure on the workpiece, to raise a problem in welding quantities. Further, it is laborious and takes a considerably long time to carry out the setting of the reference position to lower all operation efficiency of the welding operation. Furthermore, in the method of performing a spot welding operation while correcting the motion amount based on the correction amount d, it is necessary to determine and store the original position of the welding tip before abrasion in order to obtain the correction amount. This operation is required every time when the reference position is set, to lower the operation efficiency and raise a problem of maintenance.

In addition, a cycle time of spot welding operations is changed in the case of performing the welding operations with correction of abrasion amount and in the case of performing the welding operations without performing the correction of abrasion amount immediately after the teaching operation.

As stated, in the case of continuing the welding operation without performing the correction, the appropriate pressure is not obtained to rise a problem of lowering the welding quality.

SUMMARY OF THE INVENTION

The present invention provides a method of and a device capable of automatically performing adjustment of a reference position (zero position) of a welding tip and automatically compensating abrasion of the welding tip.

A reference position setting method of the present invention is for a servo spot welding gun having a stationary welding tip and a movable welding tip arranged in confronting relation to the stationary welding tip and axially driven by a servomotor. The method comprises the steps of: driving the servomotor so that the movable welding tip moves towards the stationary welding tip to press the stationary welding tip until a load exerted on the movable welding tip reaches a first threshold value; and driving the servomotor so that the movable welding tip moves in a direction away from the stationary welding tip, and storing an axial position of the movable welding tip when the load exerted on the movable welding tip is reduced to substantially zero or a second threshold value smaller than the first threshold value as a reference position.

The load exerted on the movable welding tip may be estimated by estimating means for estimating a disturbance load on the servomotor for driving the movable welding tip.

The servomotor for driving the movable welding tip may be controlled by a robot controller for controlling a robot to which the servo spot welding gun is attached.

The above steps for setting the reference position may be performed every time, when a predetermined number of spot welding operations are completed, so that the reference position is updated to compensate abrasion of the welding tips.

The present invention also provides a reference position setting device for a servo spot welding gun for carrying out the above method. Specifically, the reference position setting device of the present invention comprises: a stationary welding tip attached to the spot welding gun; a movable welding tip arranged in confronting relation to the stationary welding tip; a servomotor for axially driving the movable welding tip; estimating means for estimating a disturbance load exerted on the servomotor; control means for controlling the servomotor to move the movable welding tip towards the stationary welding tip until the disturbance torque estimated by the estimating means reaches a first threshold, and controlling the servomotor to move said movable welding tip in a direction away from the stationary welding tip until the disturbance torque estimated by the estimating means is reduced to a second threshold smaller than the first threshold; storing means for storing an axial position of the movable welding tip when the disturbance torque is reduced to the second threshold as a reference position.

The above control means for controlling the servomotor for driving the movable welding tip may comprise a robot controller for controlling a robot to which the servo spot welding gun is attached.

DETAILED DESCRIPTION OF THE PREFERRED EMBODIMENTS

Figure 1:
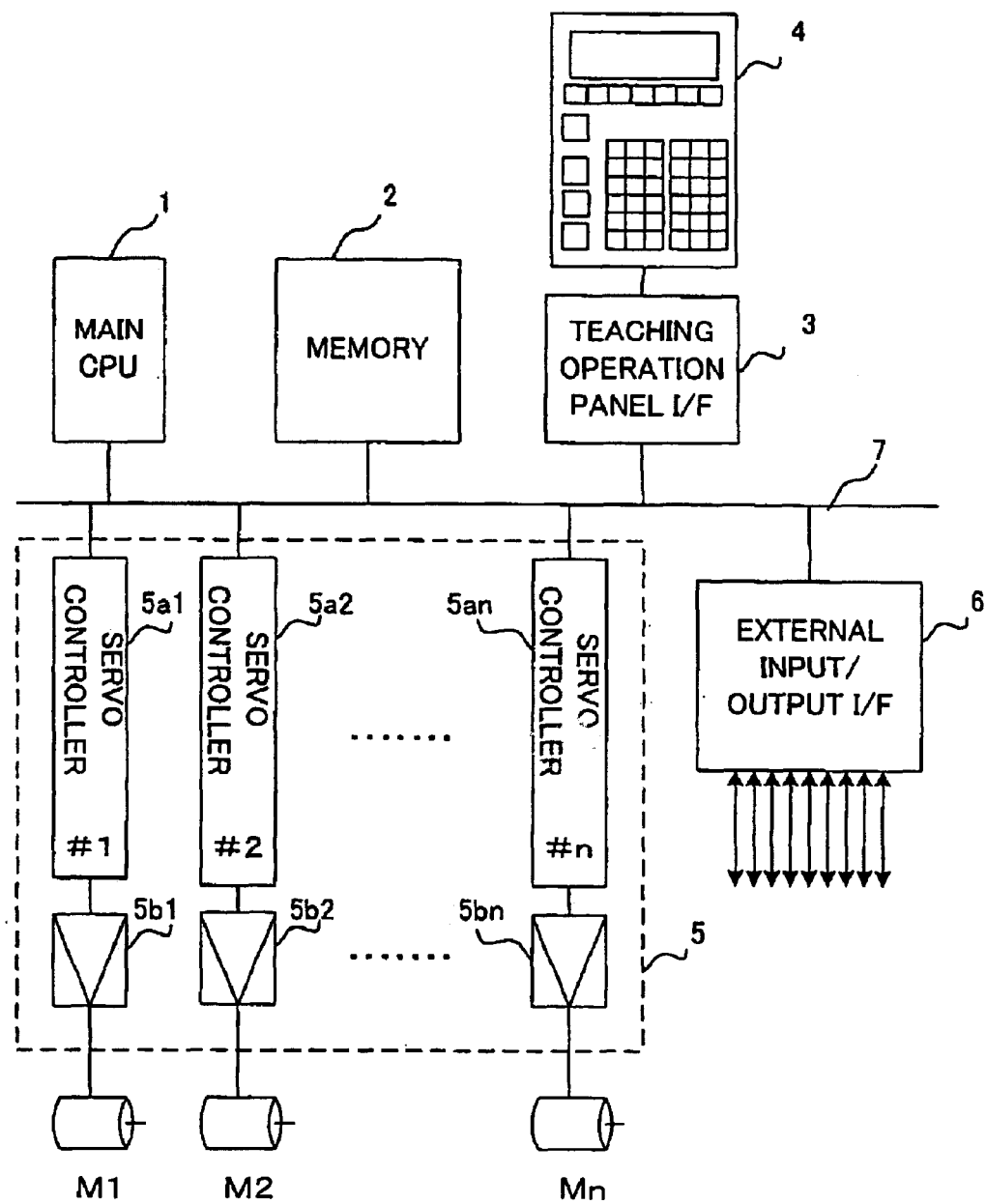
FIG. 1 is a block diagram of a robot controller for carrying out a reference position setting method for a servo welding gun according to an embodiment of the present invention.

FIG. 1 shows a robot controller for controlling a robot with a servo spot welding gun 20 attached to a wrist at a distal end of a robot arm, which carries out a method of setting a reference position of an axis of the servo spot welding gun 20 according to the present invention.

A main processor 1, a memory 2 comprising a RAM, a ROM, a nonvolatile memory such as FEPROM, an interface 3 for an teaching operation panel 4, an interface 6 for external devices and a servo control section 5 are interconnected with a bus 7.

A system program for supporting a fundamental function of the robot controller is stored in the ROM of the memory 2. Operation programs and related set data for robot operation taught by teaching operations are stored in the nonvolatile memory of the memory 2. The RAM of the memory 2 is used for temporary storage of arithmetic operation data by the processor 1.

A servo control section 5 comprises servo controllers 5a1–5an (n: a sum of the number of robot axes and an axis of a movable welding tip of the servo spot welding gun 20). Each of the servo controllers 5a1–5an has a processor, a ROM, a RAM, etc. to perform position and velocity loop controls and a current loop control of associated one of servomotors M1–Mn for driving respective axes based on motion commands produced by arithmetic operations (motion planning, interpolation and inverse transformation based on the motion planning, etc.). Each servo controller constitutes a digital servo controller for performing the position, velocity and current loop controls on the basis of software. A disturbance estimating observer is built in at least a servo controller for controlling a servomotor for the axis of the movable welding tip of the servo spot welding gun 20 in order to estimate a disturbance torque exerted on the axis.

The servomotors M1–Mn are respectively driven based on outputs of the servo controllers 5a1–5an through servo amplifiers 5b1–5bn. Although not shown in FIG. 1, a position/velocity detector is provided at each of the servo motors M1–Mn and the detected position and velocity of each servomotor are fed back to associated one of the servo controllers 5a1–5an. Sensors provided at respective positions of the robot and peripheral devices of the robot are connected to the input/output interface 6.

The above described hardware architecture of the robot controller can be basically constituted according to an arrangement of a conventional robot controller for a robot with a servo spot welding gun. In addition to the above described arrangement, an automatic position adjustment key 18 is provided at the teaching operation panel 4 according to the present invention.

Figure 2:
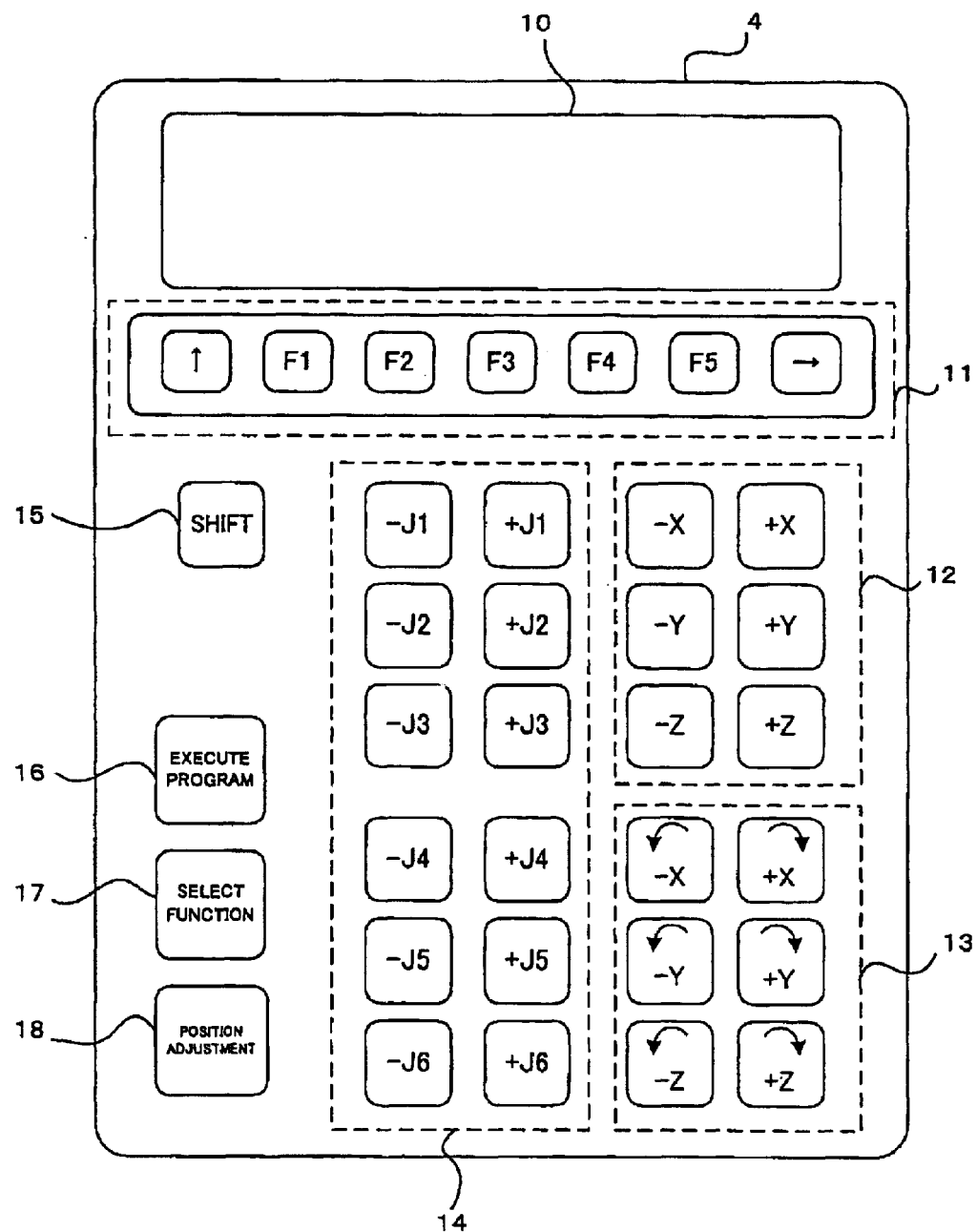
FIG. 2 is a schematic view of a teaching operation panel of the robot controller shown in FIG. 1.

Details of the teaching operation panel 4 is shown in FIG. 2. The teaching operation panel 4 is different form conventional one in that an automatic position adjustment key 18 is provided. In FIG. 2, only essential parts related to the present invention is shown. The teaching operation panel 4 has a display 10 such as LCD (liquid crystal display), an execution key 16 for execution of an operation program, linear motion keys 12 for manually operated motion of the robot in positive and negative X, Y and Z directions in a rectangular coordinate system, rotary motion keys 13 for manually operated motion of the robot in positive and negative rotational directions about X, Y and Z axes, axis motion keys 14 for manually operated motion or respective robot axes J1–J6 in positive and negative directions, and a shift key 15 to be simultaneously operated with the automatic position adjustment key 18 to allow an input operation. Further, a set of function and cursor keys 11, and a function selection key 17 for selecting various functions of the robot are provided. Various command keys are provided as in the conventional teaching operation panel in addition to the above described keys, which are omitted in FIG. 2.

An operator carries out teaching, modification, registration of operation programs, setting of various parameters, playback operations of taught operation programs and manual operation (jog feed) of the robot using the teaching operation panel 4. The display 10 is used for displaying an instruction to an operator, and displaying information on inputted data and results of simulation, etc to an operator.

Figure 3:
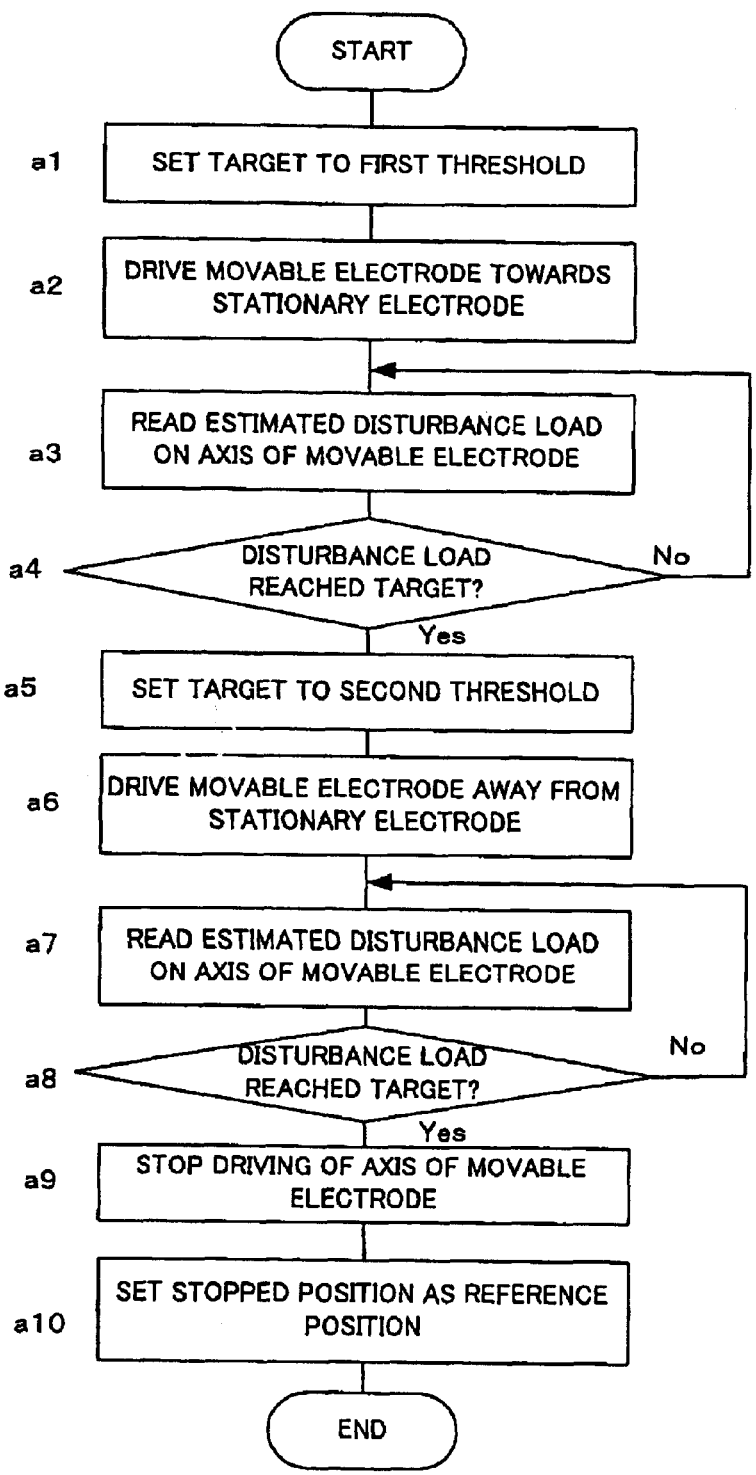
FIG. 3 is a flowchart of processing for setting and updating a reference position (zero position)

Hereinafter, a reference position setting method using the foregoing robot controller will be described referring to a flowchart of FIG. 3 and schematic diagrams of FIGS. 4a–4d. FIG. 3 shows processing to be performed by the processor 1 of the robot controller shown in FIG. 2 and FIGS. 4a–4d show operation states of the movable welding tip 21.

A first threshold value and a second threshold value are set in advance by operating the function selection key 17 on the teaching operation panel 4 The first and second threshold values are used for detecting a position of the movable welding tip 21 in contact with the stationary welding tip 22 of the servo spot welding gun 20. The first threshold value is preferably set to be greater than a frictional force applied to the axis of the movable welding tip 21 in motion so as to exclude an influence of the frictional force from the detection of the contact position. The second threshold value is set to a value smaller than the first threshold value.

The processing of updating and registering the reference position (zero position) shown in FIG. 3 is executed before teaching the robot of spot welding operations on a workpiece 40, or when the servo spot welding goal 20 is newly attached to the robot.

When the position adjustment key 18 is pressed simultaneously with the shift key 15, the processor 1 of the robot controller executes the processing of FIG. 3.

Figure 4A:
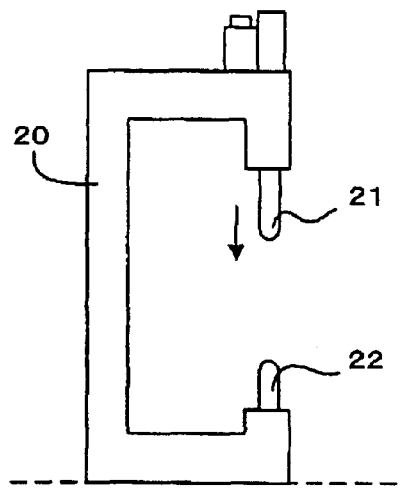
FIGS. 4a–4d are schematic diagrams showing operation for setting and updating the reference position (zero position)
Figure 4B:
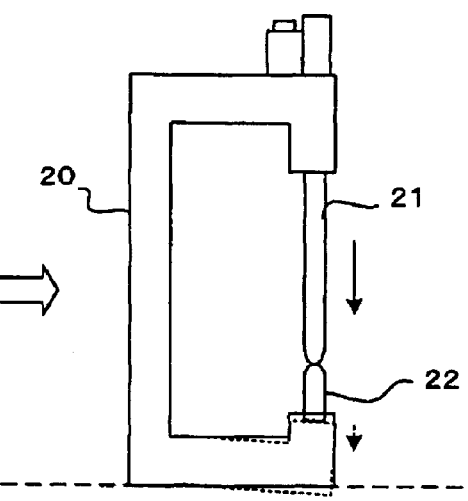
Figure 4B:
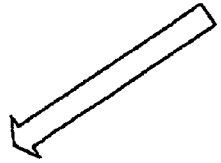
Figure 4C:
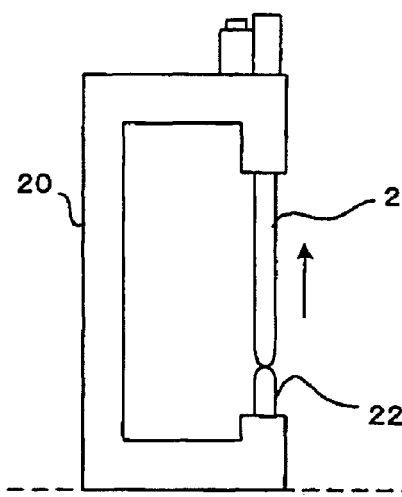
Figure 4D:
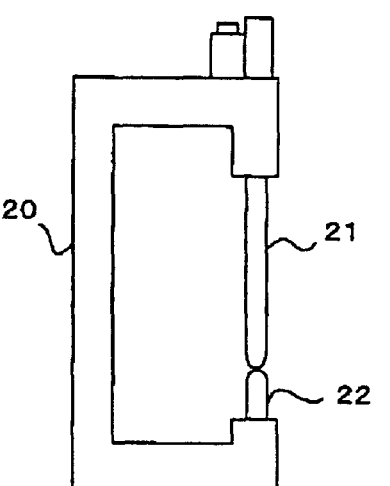

First, the processor 1 sets a target of the disturbance load to the first threshold value (Step a1), and commands to drive the servomotor for the movable welding tip 21 so that the movable welding tip 21 is moved towards the stationary welding tip 22 (Step a2), as shown in FIG. 4a. A disturbance load exerted on the axis of the movable welding tip 21, which is estimated by the disturbance estimating observer built in the servo controller for the axis of the movable welding tip 21, is read. (Step a3) The disturbance estimating observer for estimating the disturbance load on the axis of the movable welding tip 21 may be built in the processor 1. It is determined whether or not the read disturbance torque has reached the target which is set to the first threshold value at Step a1 (Step a4). If the disturbance torque has not reached the target, the procedure returns to Step a3 and the processing of Steps a3 and a4 is repeatedly executed. As shown in FIG. 4b, when the distal end of the movable welding tip 21 is brought into contact with and presses the distal end of the stationary welding tip 22, the load exerted on the movable welding tip 21 is gradually increased by rigidity of the servo welding gun 20. It should be noted that an elastic deformation of the servo welding gun 20 is depicted to be exaggerated in FIG. 4b. Thus, when it is determined that the disturbance load caused by the contact and pressing of the movable welding tip 21 with the stationary welding tip 22 reaches the target (first threshold value), the target is set to a second threshold value (Step a5). Then, the axis of the movable welding tip 21 is driven by the servomotor in the direction away from the stationary welding tip 22, as shown in FIG. 4c (Step a6). The disturbance load is read (Step a7) and it is determined whether or not the read disturbance load has reached the target (second threshold value) (Step a8) If the disturbance load has not reduced to a value equal to or lower than the target, the processing of Steps a7 and a8 is repeatedly executed. When the disturbance torque has reduced equal to or lower than the target, driving of the movable welding tip 21 is stopped (Step a9) and the stopped position of the movable welding tip 21 is stored and updated as a reference position (zero position) (Step a10).

A stroke of motion of the movable welding tip 21 for moving the distal end thereof close to the distal end of the stationary welding tip 22 to be in contact therewith is considerably long. So as to prevent an error in detection of the contact with the stationary welding tip 22 by a friction force in the stroke of motion of the movable welding tip 21, the axis of the movable welding tip 21 is driven so that the movable welding tip 21 presses the stationary welding tip 22 until the disturbance load reaches the first threshold value which is greater than the friction force, and then driven in reverse direction away from the stationary welding tip 22 to a position where the disturbance load is reduced to the second threshold value which is smaller than the first threshold value, according to the present invention. The amount of the reverse motion of the movable welding tip 21 is quite small but change of the disturbance load exerted on the movable welding tip 21 is quite large in the motion of the movable welding tip 21 from the position at which the movable welding tip 21 presses the stationary welding tip 22 to the position at which the movable welding tip 21 is just in contact with the stationary welding tip 22. The second threshold is set to substantially zero representing no load or a value equivalent to the frictional force, so that the position at which the movable welding tip 21 is just in contact with the stationary welding tip 22 is securely detected. Thus detected position is stored as the reference position (zero position) of the movable welding tip 21.

A teaching operation of teaching a predetermined sequential pattern of spot welding operations to the robot is performed after or before storing the reference position (zero position), and the predetermined pattern of spot welding operations is reproduced according to an operation program determined by the teaching operation. In each spot welding operation, the position of the movable welding tip 21 is controlled using the stored reference position (zero position).

After a long time use of the welding tips, the distal ends of the welding tip abrade by electric current and pressure in the spot welding operation. If the spot welding operation is continued with the abraded welding tips, the distal end of the movable welding tip 21 does not reach the pressing position for applying the predetermined pressure to the workpiece when the position of the distal end of the movable welding tip 21 is controlled on the basis of the decreases to deteriorate quality of spot welding. Thus, it is necessary to compensate an amount of abrasion of the welding tips. Conventionally, the abrasion amount of the movable welding tip is measured and the motion command for the movable welding tip is corrected based on the abrasion amount but this method implies the problems as discussed. According to the present invention, the reference position (zero position) is updated taking account of the abrasion of the welding tips rather than correcting the motion command for the movable welding tip.

The number of cycles of the predetermined pattern of spot welding operations in which the abrasion of the movable welding tip begins to affect quality of spot welding is determined by measurement, and the number of cycles are set to the robot controller in advance.

Figure 5:
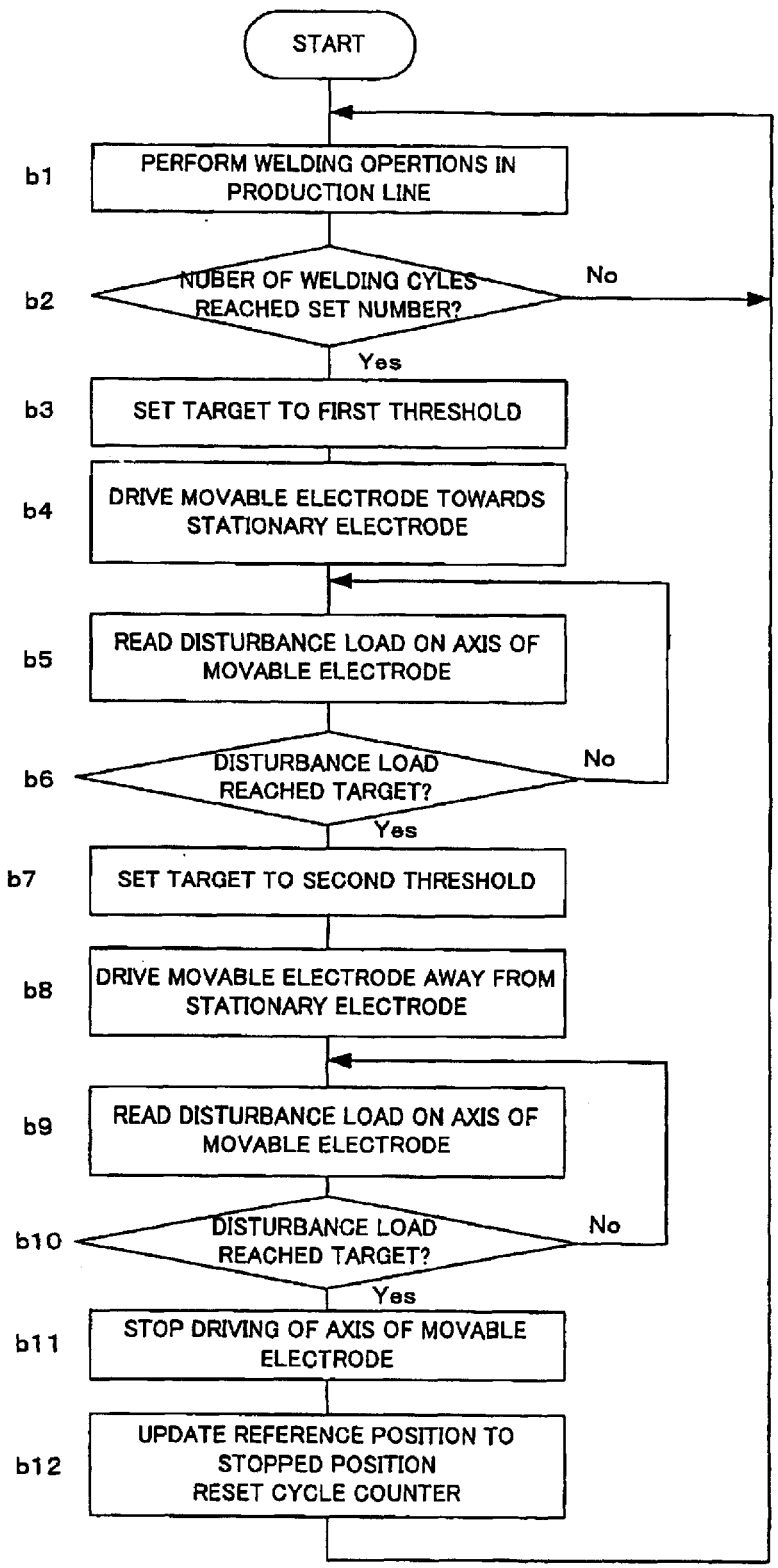
FIG. 5 is a flowchart of processing for updating a reference position (zero position) in cycles of welding operations in a production line.

FIG. 5 shows processing of updating the reference position (zero position) in cycles of the predetermined pattern of spot welding operations in a production line.

As described, after the sequential pattern of spot welding operations is taught and the reference position (zero position) is set and stored, a series of spot welding operations are performed in a production line according to the taught sequential pattern (Step b1). A series of spot welding operations is repeatedly performed until the number of cycles of the welding operations reaches the set number for automatic position adjustment of the welding tips (Step b1, b2). A counter for counting the number of cycles of the spot welding operations is reset when a series of welding operations is started after the sequential pattern of welding operations is taught.

The number of cycles of the spot welding operations reaches the set number, the processing of Step b3 and the subsequent Steps, which is equivalent to Steps a1–a10 in FIG. 3, is executed Particularly, processing of detecting a position of the movable welding tip 21 in contact with the stationary welding tip 22 and updating the reference position (zero position) to the detected position is executed. The movable welding tip 21 is shortened by abrasion and the position of the axis of the welding tip 21 with the distal end thereof in contact with the distal end of the stationary welding tip 22 is changed with the abrasion and the reference position (zero position) of the axis of the movable welding tip 21 is updated to the changed position. The processing of Steps b3–b12 in FIG. 5 is different form the processing of Steps a1–a10 in FIG. 3 in that the counter for counting the cycle number of spot welding operations is reset at Step b12.

After the reference position (zero position) of the movable welding tip is updated, spot welding operations are carried out by controlling the position of the movable welding tip 21 based on the updated reference position (zero position).

The stationary welding tip 22 is also shortened by abrasion in welding as well as the movable welding tip 21 and an amount of abrasion of the stationary welding tip 22 is determined and the positioning of the servo welding gun 20 is corrected so that the distal end of the stationary welding tip 22 is brought into contact with the workpiece 40 according to the conventional method.

Figure 6A:
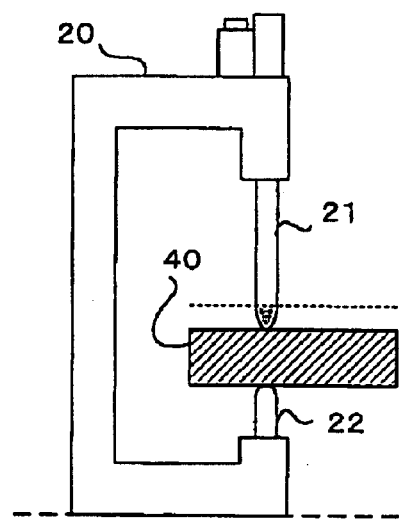
FIGS. 6a–6d are schematic diagrams showing operation for updating the reference position (zero position) in the cycles of welding operations.
Figure 6B:
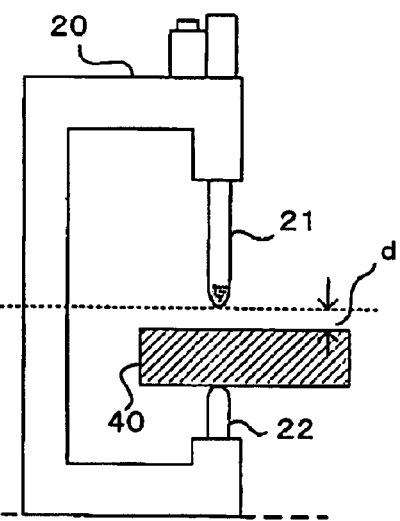
Figure 6B:
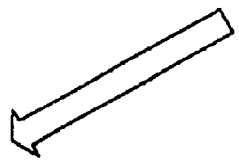
Figure 6C:
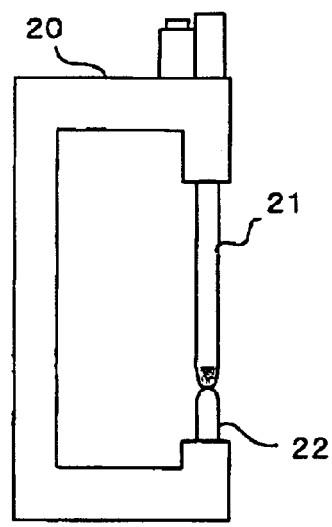
Figure 6D:
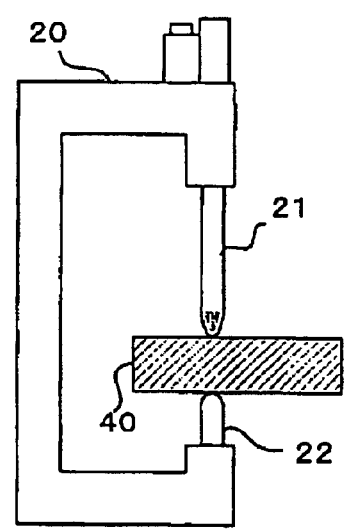
Figure 7A:
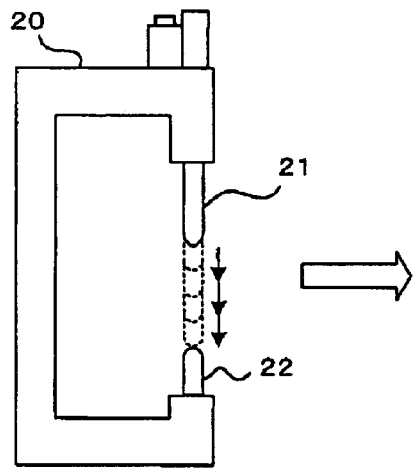
FIGS. 7a–7e are schematic diagrams showing a conventional method of determining a reference position (reference position) before teaching operation, an original position of a movable welding tip (before abrasion), and correcting a motion amount after abrasion of the welding tip.
Figure 7B:
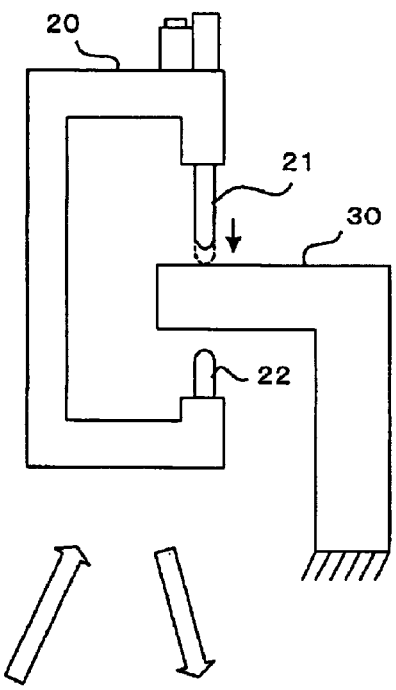
Figure 7C:
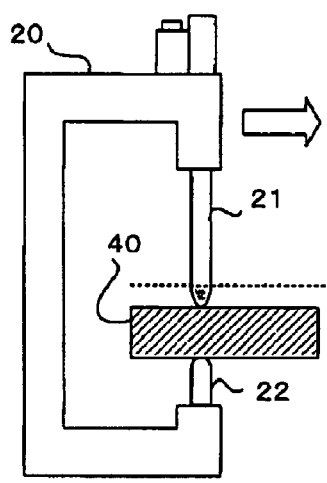
Figure 7D:
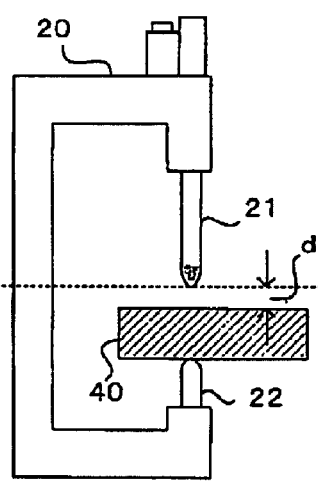
Figure 7E:
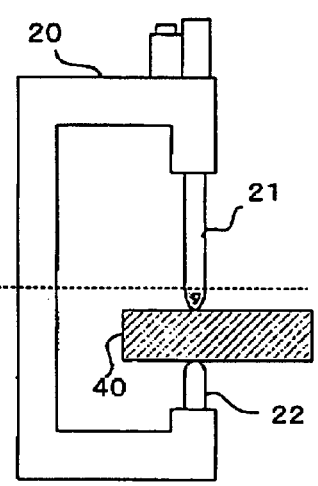

FIGS. 6a–6d schematically show operations for automatically updating the reference position of the movable welding tip in cycles of spot welding operations. FIG. 6a shows a state of the movable welding tip 21 and the stationary welding tip 22 in the spot welding operation immediately after the teaching operation of the sequential pattern of the spot welding operations, and FIG. 6b shows a state where the movable welding tip 21 is abraded to fail in applying the predetermined pressure to the workpiece 40. The distance "d" between the pressing position and the position of the distal end of the abraded movable welding tip 21 is depicted as exaggerated to be remote from a surface of the workpiece 40. Before coming into the state shown in FIG. 6b, the updating of the reference position (zero position) is performed as shown in FIG. 6c, as described. After correcting the reference position (zero position, the position of the movable welding tip 21 is controlled on the basis of the corrected reference position so that the distal end of the movable welding tip is moved to the pressing position for applying the predetermined pressure to the workpiece 40, to secure welding quality.

According to the present invention, the position of the movable welding tip in contact with the stationary welding tip is automatically and precisely determined and the reference position (zero position) of the movable welding tip is automatically set and updated, to realize high efficiency and high precision of spot welding operation, in comparison with the conventional method of setting the reference position by manual operation with an operator's visual confirmation which takes a considerable time with dispersed precision. The original position of the movable welding tip before the teaching operation (before abrasion of the welding tip), which has been required to be measured and stored for determining all amount of abrasion of the movable welding tip to correct the motion command, is not necessary to be determined and stored, so that operation for compensating the abrasion of the welding tip is made efficient. Further, the reference position (zero position) of the movable welding tip is automatically updated before the welding tips are abraded to an extent where the predetermined pressure is not applied to the workpiece to fail in performing an appropriate spot welding, so that the predetermined pressure for performing an appropriate spot welding is maintained to keep good welding quality.

Furthermore, since it is not necessary to correct the motion command to move the movable welding tip according to the present invention, the same operation time period is maintained and the variation of cycle time is reduced in comparison with the conventional method in which welding operations are performed with and without the correction of the motion amount to vary cycle time of the welding operations.

What is claimed is:

1. A reference position setting method for a servo spot welding gun having a stationary welding tip and a movable welding tip arranged in confronting relation to the stationary welding tip and axially driven by a servomotor, comprising:

driving said servomotor so that said movable welding tip moves towards said stationary welding tip to press the stationary welding tip until a load exerted on the movable welding tip reaches a first threshold value; and driving said servomotor so that said movable welding tip moves in a direction away from said stationary welding tip, and storing an axial position of the movable welding tip when the load exerted on the movable welding tip is reduced to substantially zero or a second threshold value smaller than the first threshold value as a reference position.

2. A reference position setting method for a servo spot welding gun according to claim 1, wherein the load exerted on said movable welding tip is estimated by estimating means for estimating a disturbance load on said servomotor for driving said movable welding tip.

3. A reference position setting method for a servo spot welding gun according to claim 1, wherein said servomotor for driving said movable welding tip is controlled by a robot controller for controlling a robot to which said servo spot welding gun is attached.

4. A reference position setting method for a servo spot welding gun according to claim 1, wherein said driving said servomotor so that said movable welding tip moves toward said stationary welding tip and away from said stationary welding tip are performed every time when a predetermined number of spot welding operations are completed, to update the reference position.

5. A reference position setting device for a servo spot welding gun comprising:

a stationary welding tip attached to the spot welding gun;

a movable welding tip arranged in confronting relation to said stationary welding tip;

a servomotor for axially driving said movable welding tip;

estimating means for estimating a disturbance load exerted on said servomotor;

control means for controlling said servomotor to move said movable welding tip towards said stationary welding tip until the disturbance torque estimated by said estimating means reaches a first threshold, and controlling said servomotor to move said movable welding tip in a direction away from said stationary welding tip until the disturbance torque estimated by said estimating means is reduced to a second threshold smaller than the first threshold;

storing means for storing an axial position of said movable welding tip when the disturbance torque is reduced to the second threshold as a reference position.

6. A reference position setting method for a servo spot welding gun according to claim 5, wherein said control means for controlling the servomotor for driving the movable welding tip comprises a robot controller for controlling a robot to which said servo spot welding gun is attached.

7. A method comprising:

moving a first welding tip towards a second welding tip to press the welding tips together until a load exerted on the first welding tip reaches a first threshold value; and moving said first welding tip in a direction away from said second welding tip, and storing an axial position of the first welding tip when the load exerted on the first welding tip reaches a second threshold value smaller than the first threshold value as a reference position.

* * * * *

UNITED STATES PATENT AND TRADEMARK OFFICE
CERTIFICATE OF CORRECTION

PATENT NO. : 6,888,089 B2
DATED : May 3, 2005
INVENTOR(S) : Koichi Okanda et al.

It is certified that error appears in the above-identified patent and that said Letters Patent is hereby corrected as shown below:

Title page,
Item [56], References Cited, insert
-- OTHER PUBLICATIONS
Patent Abstract of Japan, Publication No. 11285849, Publication Date: October 19, 1999
Applicant: Nissan Motor Company, Ltd. --.
Item [57], ABSTRACT,
Line 7, change "fist" to -- first --.

Column 1,
Line 11, change "lip" to -- tip --.

Column 2,
Line 19, change "movable." to -- movable --.

Column 3,
Line 49, change "time," to -- time --.

Column 4,
Lines 48-49, change "operation" to -- operations --.

Column 5,
Line 36, change "or" to -- of --.

Column 6,
Line 6, change "goal" to -- gun --.

Column 7,
Line 27, after "of the" insert -- reference position (zero position), so that the pressure applied to the workpiece --.
Line 61, after "executed" insert -- . --.

UNITED STATES PATENT AND TRADEMARK OFFICE
CERTIFICATE OF CORRECTION

PATENT NO. : 6,888,089 B2
DATED : May 3, 2005
INVENTOR(S) : Koichi Okanda et al.

It is certified that error appears in the above-identified patent and that said Letters Patent is hereby corrected as shown below:

<u>Column 8,</u>
Line 5, change "form" to -- from --.
Line 35, after "(zero position" insert -- ) --.

Signed and Sealed this

Second Day of May, 2006

JON W. DUDAS
*Director of the United States Patent and Trademark Office*